Jan. 20, 1959 G. M. GIBSON 2,870,356
ELECTRIC MOTOR STRUCTURE
Filed July 8, 1955 6 Sheets-Sheet 1

INVENTOR.
George M. Gibson
BY
Eberhard E. Wetley
Atty.

Jan. 20, 1959  G. M. GIBSON  2,870,356
ELECTRIC MOTOR STRUCTURE
Filed July 8, 1955  6 Sheets-Sheet 3

INVENTOR.
George M. Gibson
BY
Eberhard E. Wattey
Atty.

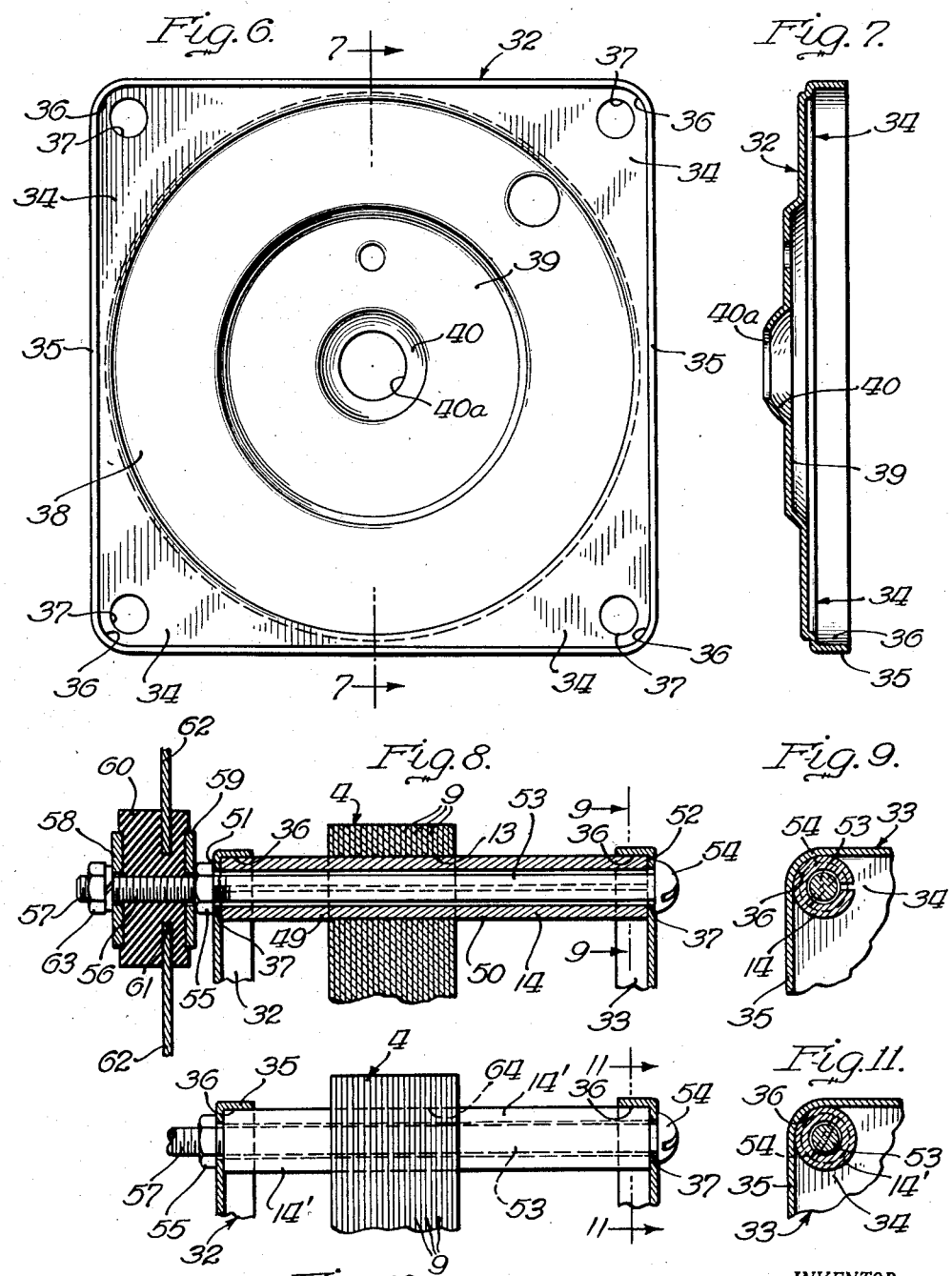

Jan. 20, 1959  G. M. GIBSON  2,870,356
ELECTRIC MOTOR STRUCTURE
Filed July 8, 1955  6 Sheets-Sheet 5
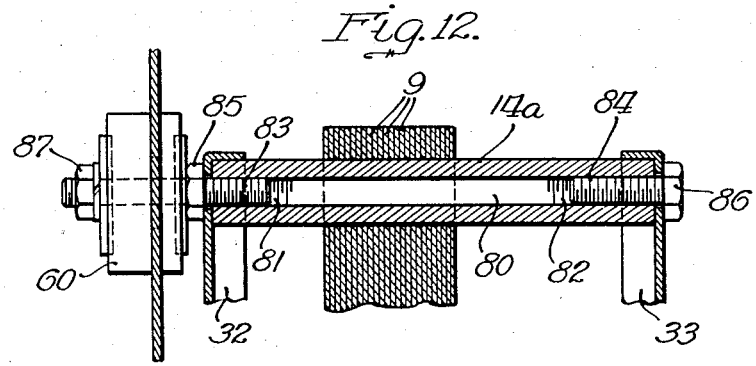
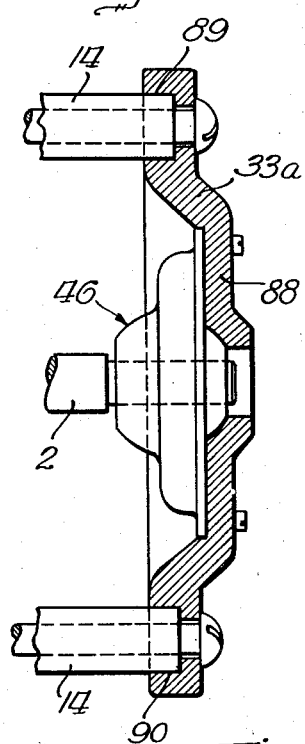
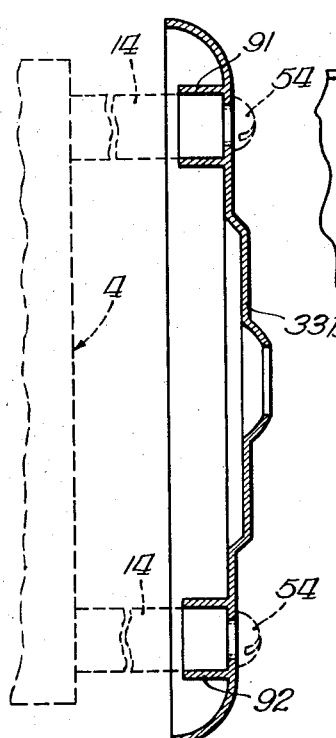
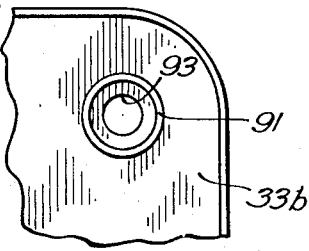
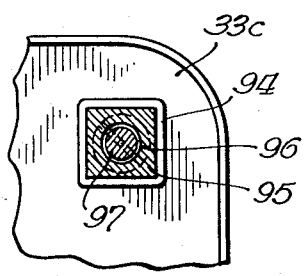
INVENTOR.
George M. Gibson
BY
Eberhard E. Wetley
Atty.

Jan. 20, 1959  G. M. GIBSON  2,870,356
ELECTRIC MOTOR STRUCTURE
Filed July 8, 1955   6 Sheets-Sheet 6
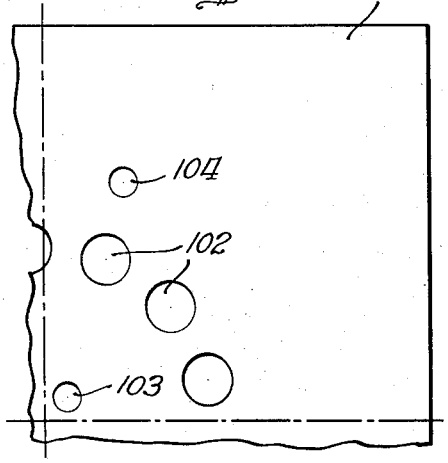
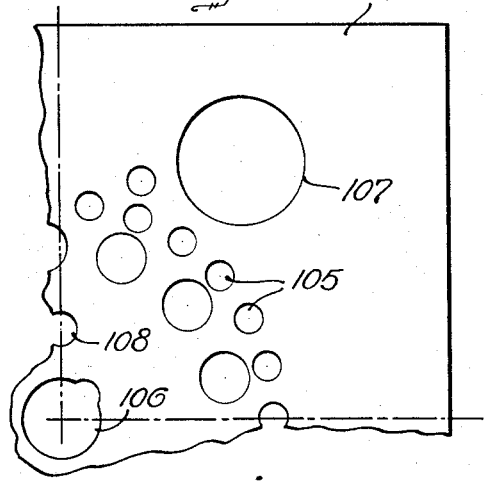
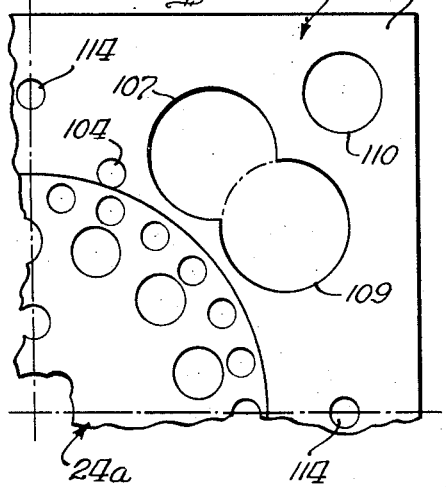
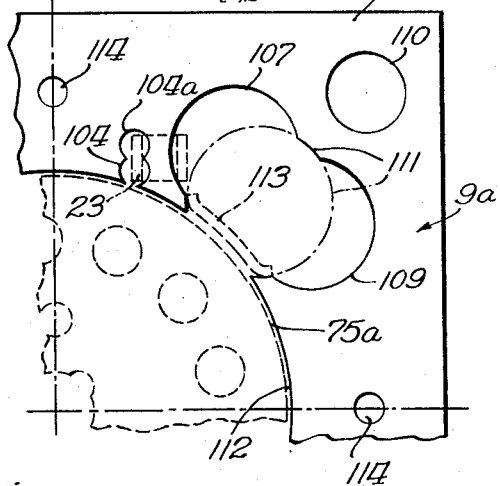
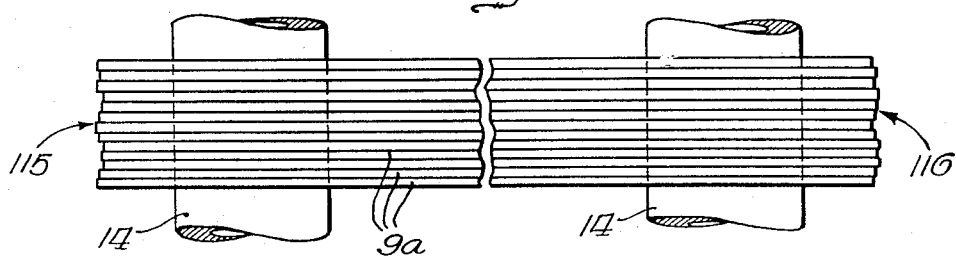
INVENTOR.
George M. Gibson
BY
Eberhard E. Wettley
Latty.

United States Patent Office 2,870,356
Patented Jan. 20, 1959

2,870,356

ELECTRIC MOTOR STRUCTURE

George M. Gibson, Bellevue, Iowa

Application July 8, 1955, Serial No. 520,792

11 Claims. (Cl. 310—258)

The present invention relates generally to improvements concerned with electric motors. More particularly, the invention is directed to certain improvements and refinements in the detailed construction and assembly of electric motors as applied to the individual elements and the assembled combination of such elements into finished, practical and efficient electric motor units that are adapted for many uses and installations requiring electric motive power.

One of the objects of this invention is to provide an orientation arrangement for the assembly of the individual motor mechanisms particularly including the motor armature shaft bearings which are accurately positioned in predetermined relation with respect to the motor stator having a core to receive the armature, and these relationships are brought about through the cooperative end plates and stator assembly mechanisms, all of which are arranged with specific reference to adequate motor ventilation and cooling.

A further more specific object of the present invention is to provide a stator with an alignment assembly arrangement for the stator laminations and wherein such alignment assembly also provides additional means to provide both axial and lateral positioning of the frame plates of the motor and wherein both such orientation facilities also directly line up the armature and armature shaft of the electrical device with respect to the balance of the motor structure and in bearings that are prealigned and carried by said frame plates.

Another object of this invention is to provide a motor of simplified design and construction incorporating the new ventilating and cooling construction having a fan arranged for ventilating such motor parts and mechanisms and in a manner whereby it is possible to efficiently maintain such motor in operation and to prevent failures and breakdowns under operative conditions.

Another object of this invention is to provide a predetermined arrangement of assembled parts and wherein the mechanisms comprising the end frames are used as baffles positioned in predetermined relation with respect to the stator unit and wherein the stator and armature mechanisms are apertured in a given manner to provide an efficient and thorough ventilation arrangement for the entire motor. This ventilating system is obviously supplemented by the fan or air turbulence means hereinbefore referred to.

As a further object of this invention the individual laminated stator plates and the individual laminated armature plates are all constructed from circular punchings or circular dies in such a manner so that substantially all of the apertures and openings in the respective plates aforementioned are all formed with the circular punches or die units. The use of such circular punches or dies in obtaining the various cutout portions of the stator or armature plates considerably reduces the cost of manufacture of such plates as particularly reflected in the maintenance and upkeep of the particular dies that are used for this purpose.

Another object of this invention is to provide stator plate orientation means that cooperate with alignment reference openings all bearing predetermined and accurate relations with respect to the electrical designed openings and core portions of the plates whereby all plates in the stack can be collectively assembled to have all the formed plate openings disposed in perfect alignment for proper accommodation of the rivets, coils, armature and other associated motor parts connected with the stack.

Other objects and advantages relating to the electric motor constructed according to the concept of the present invention shall hereinafter be referred to in the following detailed description having reference to a preferred construction of motor and to several modifications thereof as illustrated in the accompanying drawings which form a part of this specification.

In the drawings:

Figure 6 is an inside side elevational view of one of the end frame plates which are identical in construction, there being two such plates used;

Figure 7 is a cross sectional view of the frame plate shown in Figure 6 and as seen along the line 7—7 in Figure 6;

Figure 8 is a longitudinal cross sectional view taken substantially along the line 8—8 in Figure 1 showing a section through the plate alignment bushing arrangement used which comprises one of the orientation structures of the motor construction;

Figure 9 is a detailed cross sectional view of the bushing means as taken substantially along the line 9—9 in Figure 8;

Figure 10 is a further detailed cross sectional view similar to that shown in Figure 8 but illustrating a modified construction of the orientation bushing arrangement;

Figure 11 is a detailed cross sectional view taken along the line 11—11 of Figure 10 to illustrate certain other details of the modified structure;

Figure 12 is a detailed cross sectional view of another form of orientation means;

Figure 13 illustrates a modified construction of end plate used in connection with the motor structure and for the orientation assembly with the bushing units;

Figure 14 shows another modified arrangement of an end plate;

Figure 15 shows a fragmentary side view of a corner portion of the plate illustrated in Figure 14;

Figure 16 is a further modified arrangement of the orientation means shown in Figures 14 and 15 but wherein a square arrangement is adapted for the same purpose;

Figure 17 is a plan view of a roll of steel stock to show the initial step in providing material for the manufacture and production of the stator plates and rotor plates;

Figures 18, 19, 20 and 21 illustrate four successive stages in the method of producing the stator plates and armature plates including the design of the present invention which plates are substantially similar to that shown in the original form, each of the views comprising a quarter section of the complete plate; and Figure 22 is an enlarged side elevational view of a group of stator plates assembled upon the orientation bushings to emphasize the irregularities of the outer contours of these plates.

Figure 2:
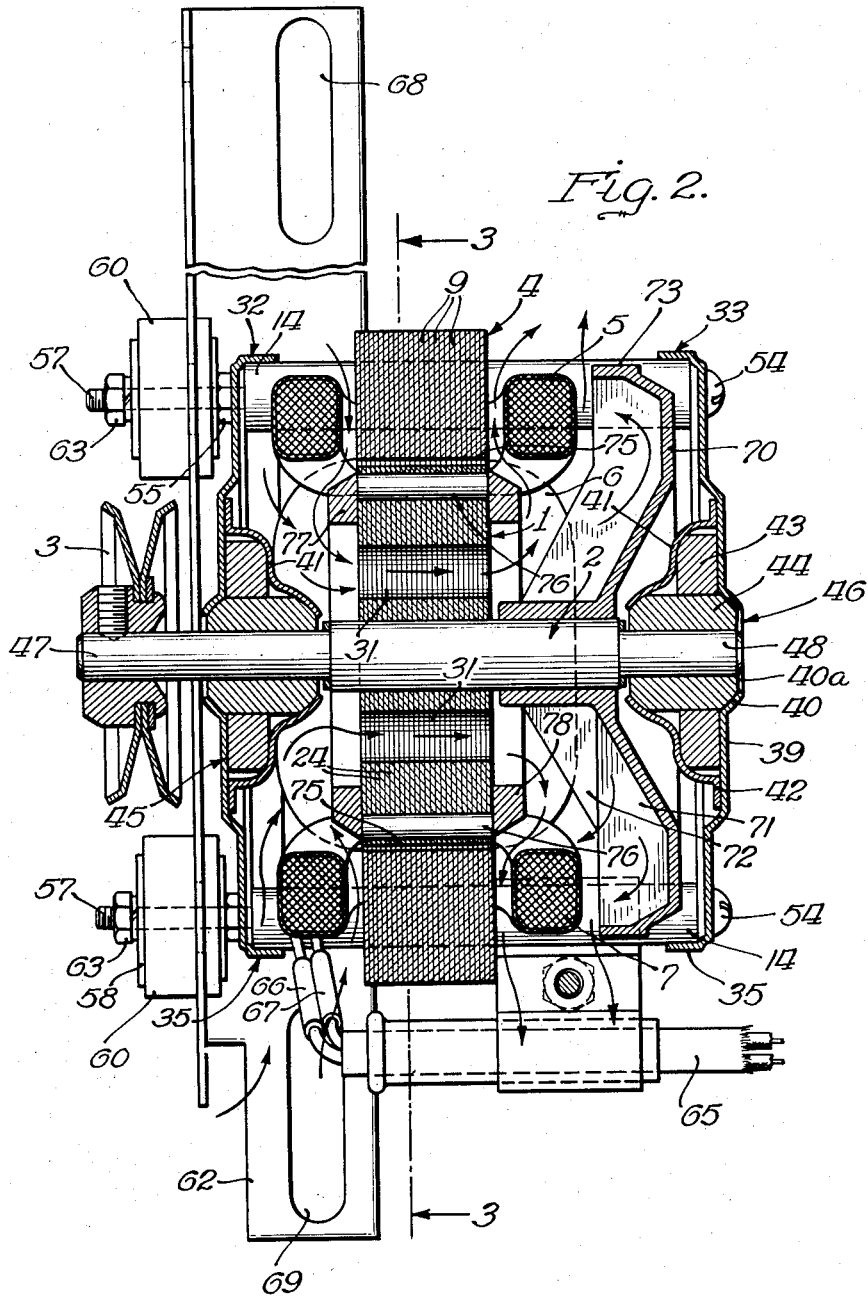
Figure 2 is a vertical axial cross sectional view of the motor illustrated in Figure 1 and as seen substantially along the line 2—2 indicated therein.

The invention, which is best illustrated in Figure 2 of the drawings, comprises a conventional type of squirrel cage rotor or armature 1 press fitted or otherwise suitably secured to a motor shaft 2 that carries a power drive pulley 3 upon one protruding end thereof. The stator stack 4 is designed and arranged for particular adaptation and use in connection with a plurality of form wound coils 5, 6, 7 and 8.

The stator stack 4 comprises a plurality of laminations in the form of plates 9 which are square in peripheral outline and which each include a central rotor opening 10 within which openings the assembled armature is rotatably positioned for electrical operation.

Through the use of the square laminations or plates 9, which are fastened together by means of rivets 11, it is possible to obtain a suitable and economical electrical field unit that supports and protects the individual form wound coils 5, 6, 7 and 8 and wherein the corner portions 12 provide structural sections for prelocated openings 13 which are formed with predetermined diameters to receive split bushings such as 14 therethrough.

Figure 3:
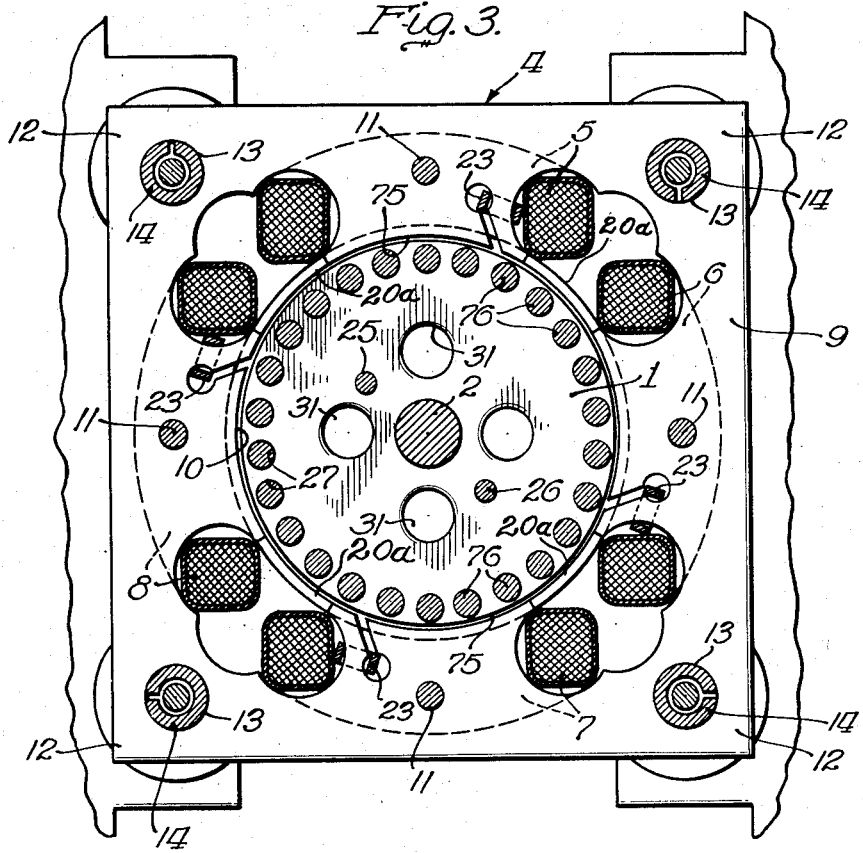
Figure 3 is a transverse vertical cross sectional view taken substantially along the line 3—3 in Figure 2 to illustrate certain details of construction of the motor unit.
Figure 4:
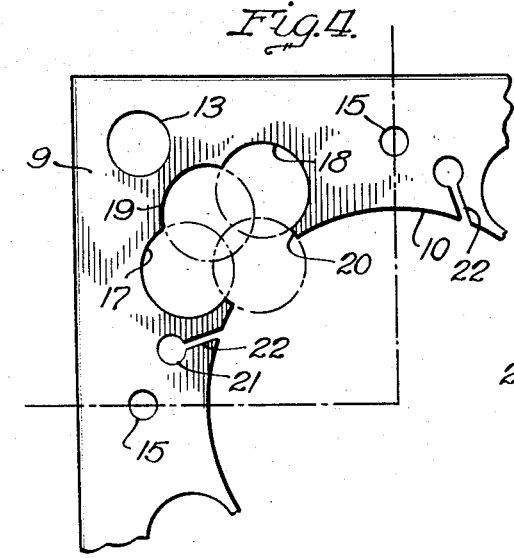
Figure 4 is a fragmentary portion of one of the stator laminations or motor plates per se showing a little more than one-quarter section thereof which quarter section is duplicated in the other three-quarter sections not shown.

Referring again to Figure 3 and specifically to Figure 4, the latter of which illustrates one quarter section of one of the stator laminations or plates 9, it being understood that all four portions of the completed stator laminations are completely symmetrical and identical to the one shown, and these stator laminations are all constructed from dies or punches of circular outline. Thus the openings 15 are established for the reception of the rivets which tie the stator laminations together while the openings such as 13 are also circular as the openings 15 and comprise the means for receiving the split orientation sleeves. Furthermore, the end portions of the adjacent form wound coils are carried in openings 17 and 18, which, together with intermediate openings 19 and 20, form a composite clover leaf design in each quarter sector of the lamination or plate 9.

As best seen in Figure 4, each of the surfaces of the compound opening formed is made through die or punch members having circular contours and the clover leaf arrangement, when considered annularly with respect to the core opening 10, forms longitudinal slots with opening 19 providing an air circulating passageway and with the opening 20 also providing air passageway means and an entrance opening for assembling the coils into the stator stack laminations. Suitable magnetic bridge elements 20a may also be annularly secured in openings 20 as seen in Figure 3.

In addition, each quarter section of the stator plate carries a circular opening 21 with the narrow slot 22 leading out of this opening into the core or center opening 10 to provide means for the assembly and addition of shading coils generally indicated at 23 in Figure 3. Thus, with the exception of the slots 22, the entire stator plate in the described form can be made from circular punchings which are specifically advantageous in maintaining the cost of fabrication of such a plate at a minimum. All punches of circular cross section require a minimum of cost and maintenance and are also advantageous and operable under a minimum amount of forming pressure exerted upon the dies that produce these laminated stator plates.

Figure 5:
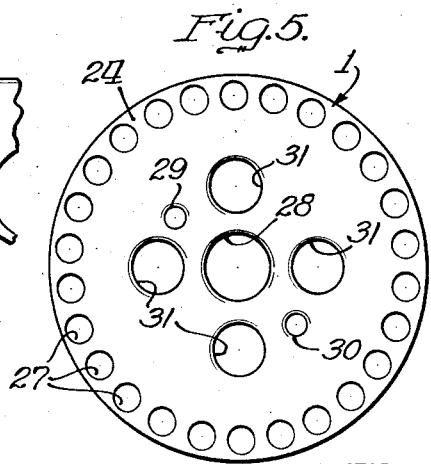
Figure 5 is a side elevational view of one of the armature laminations per se illustrating the general arrangement of the openings therein.

In the same connection and as illustrated in Figure 5, the rotor or armature 1 comprises a plurality of plates formed out of the core pieces of the stator plates and which are individually indicated at 24 in Figures 2, 3 and 5 and shown fastened together by means of rivets 25 and 26 whereby a selected number of laminated plates 24, when stacked together, form an armature having a longitudinal body which electrically cooperates with the stator stack 4.

As noted in Figure 5, the plates 24 of the rotor include the peripherally located apertures 27, a central opening 28 which receives the motor shaft 2, and openings 29 and 30 provided for the reception of the rivets 25 and 26, and each of the laminated plates 24 also includes openings 31 which are provided as air channels for ventilating and cooling the rotor or armature 1. As in the die fabrication of the stator plates 9, it is to be noted that all of the openings formed in the circular rotor plates are also of circular configuration so that these respective plates can also be made with a relatively inexpensive die operation and maintenance.

As best illustrated in Figures 2, 6 and 7, each motor includes the end frame plates 32 and 33 respectively with plate 32 being illustrated in detail in Figures 6 and 7. Each of the plates are alike in configuration and in contour and are made from stampings as is best evident from Figures 6 and 7 with the respective parts of each plate containing the same reference characters in the following description. Each plate comprises a dished member having a square contour with the corner face wall portions thereof shown at 34 comprising coplanar areas which are collectively outlined and merge into a peripheral plate flange 35 which includes circular corner deformations 36 that are arranged in concentric fashion to openings 37, with these deformations partially encircling such openings.

Each plate is then further constructed and arranged to include an annular dished portion 38 which merges into the central annular dished portion 39 which terminates in a spherical annular socket 40 including the aperture 40a which accommodates the motor shaft 2. As best shown in Figure 2, the dished portion 39 carries a circular hood 41 which is flanged as at 42 for connection with the dished portion 39 by spot welding, sweating or through other suitable means for confining the oilless bearing members 43 and 44 between the circular hood 41, the dished portion 39 and the spherical socket portion 40.

With this arrangement, each of the end frame plates 32 and 33 carry aligned bearing units 45 and 46 to receive the reduced ends 47 and 48 of the motor shaft 2. Obviously, each of the bearings 45 and 46 is aligned with prearranged accuracy at the midpoint of each of the end frame plates with the bearings having their axes coincident with the normal perpendicular passing through the midpoint of such motor plates.

The various mechanisms of the motor comprising the armature or rotor 1, the stator stack 4, plates 32 and 33 and obviously the rotor shaft and bearing structures are assembled by means of the split bushings 14 as may be best described in connection with Figures 2, 3, 8 and 9. Each of the bushings 14 is forced through a predetermined number of laminated stator plates 9 with the bushings extending through the aligned openings 13 in the plate group of the stator. Obviously, this bushing is relatively sturdy and of material thick enough the expand outwardly to form a maximum diameter bushing which is coincident with the internal diameter of the hole 13. Furthermore, each of the bushings is provided of a predetermined length to establish projections or extensions 49 and 50 so that the terminal ends 51 and 52 of the bushings occupy a given predetermined spaced relation with respect to the opposite faces of the stator stack 4.

As shown in Figures 2 and 8, the projections 49 of the bushings 14 are shorter than the projections 50 so that the end frame plates 32 and 33 which abut the respective terminal ends of the bushings 14 with their coplanar portions 34 are thus positioned in different predetermined spaced relations with respect to the opposite outer faces of the stator stack.

As best shown in Figures 6, 7 and 8, each of the deformations 36 of one of the plates 32 and 33 is made of a curvature or diameter that coincides with the outer peripheral circular contour or diameter of the bushings and the openings 37 are positioned to be in line with the bushing axes. By having the four bushings as illustrated in Figure 3 positioned as there shown, it is possible to engage each of the end plates over the end portions of the bushings with the deformations 36 partially encircling and embracing each of the bushings to include the entire four bushings within the peripheral extent of the peripheral plate flange 36 that encircles each of the frame plates. It should also be noted that each of the opposite terminal end groups or sets of extreme tips 51 and 52 of each of the bushings 14 are disposed to occupy coplanar positions when considered in transverse planes disposed at right angles to the shaft axis of the motor and as determined by the force fitted bushing locations when considered with respect to the opposite faces of the stator stack 4. As previously described, each of the four coplanar wall areas 34 in the corner sections of each of the plates are thus adapted to provide an abutting surface which will engage each of the four ends of the respective bushings with one plate such as 32 and 33 to each side of the stator stack. This provides a definite positioning of the entire plate in relation to the stator stack and its central bore whereby the bearing units 45 and 46 are positioned and aligned in a predetermined relation to the stator stack and its bore so that the assembly of the bearings over the shaft ends 47 and 48 of shaft 2 as confined within the bearings in such plates supports the armature or rotor 1 for rotation within the rotor opening 10 of the stator stack. Any suitable means may be provided to given the motor shaft a predetermined position endwise of the motor structure and also to position the rotor or armature plates 24 in a given relation with respect to the shaft so that this armature will be aligned within the confines or extent of the stator stack.

To maintain the described parts in the assembled relationship hereinbefore defined, a through bolt 53 is carried within each of the hollow bushings and through the respective openings 37 in the end frame plates with the bolt head 54 engaging the outer surface of one of the frame plates and with a suitable nut 55 screwed upon a threaded end 56 of the bolt 53 with the nut 55 drawn up tightly to bring the plates into the firm engagement with respect to the bushing ends 51 and 52. In addition, each bolt 53 is proportioned in size so as to have an extended end 57 projecting considerably beyond the adjacent face of the adjacent frame plate. As shown in Figure 8, the through bolt 53 may be inserted in the direction illustrated with the extension 57 on the left or the bolt may be positioned in the opposite direction to place the extended end to the right.

In either event, the extension 57 of bolt 53 can be suitably secured through appropriate washer members 58 and 59 to an apertured rubber bushing 60 which is carried in a suitable opening 61 in a bracket or other selected support 62 and with a locking or securing nut 63 on bolt 53 to firmly mount the extended end 57 of the bolt 53 with reference to the bushing 60 on the bracket.

With the arrangement illustrated, the motor may be supported in out board fashion from either end plate side thereof or, if necessary, two of the bolts 53 may be carried with the extensions at one side of the motor construction with two of the other bolts extending to the opposite side for connection with spaced brackets that can be positioned at both sides of the motor.

In Figures 10 and 11, a modified arrangement is illustrated wherein the bushings are shown at 14' and are made of solid sleeve members with a predetermined outer diameter. These bushings are hollow to accommodate the bolts 53 and each of the bushings is press fitted through orientation openings 64 formed through the laminated plates of the stator stack 4. The other portions of this general arrangement are identical with the construction described and defined in connection with Figures 8 and 9 of the motor construction.

In general, other details of the electrical circuit and motor construction are of a conventional nature and as shown in Figure 2, the power supply cable is indicated at 65 including the dual wires 66 and 67 which connect with the coil arrangement in any suitable fashion for purposes of operating the motor. As also shown in Figure 2, the bracket 62 includes slots 68 and 69 to provide a vertically adjustable mounting for the motor proper.

With further reference to Figure 2, it should be noted that the shaft 2 of the motor carries a ventilating fan 70 which is suitably secured to the shaft to rotate directly therewith. This fan is provided with a plurality of radial blades 71 and 72 which centrifugally force air outwardly between end plate 33 and the adjacent face of the stator stack 4, and radially through the wide open peripheral portion of the motor construction which areas are only traversed by the respective bushings which hold the entire assembly together.

When the motor is in operation, air is drawn radially inwardly between the end frame plate 32 and the adjacent face portion of the motor stator stack 4 or is drawn through the openings such as 19 and 20 of the clover leaf apertures along the coil sections located therethrough which provide direct cooling channels for the coils and for the adjacent portions of the stator plates. In addition, air is drawn from the left hand side of the motor as illustrated in Figure 2 through the openings 31 in the armature or rotor 1 and principally through the annular opening 75 surrounding the rotor. Thus air is drawn through the core section or portion of the stator stack over the external portion of the armature and through the coil openings in the stack, etc., for movement toward the frame 33 and for radial expulsion out of the motor confinements as described. With this arrangement, the end plates 32 and 33 provide axially positioned protective frames for the entire motor construction and supply the main assembly units thereof, while the same plates, together with the stator stack and armature arrangement, form air channelling means to efficiently and thoroughly cool the electrically heated motor elements described.

Figure 1:
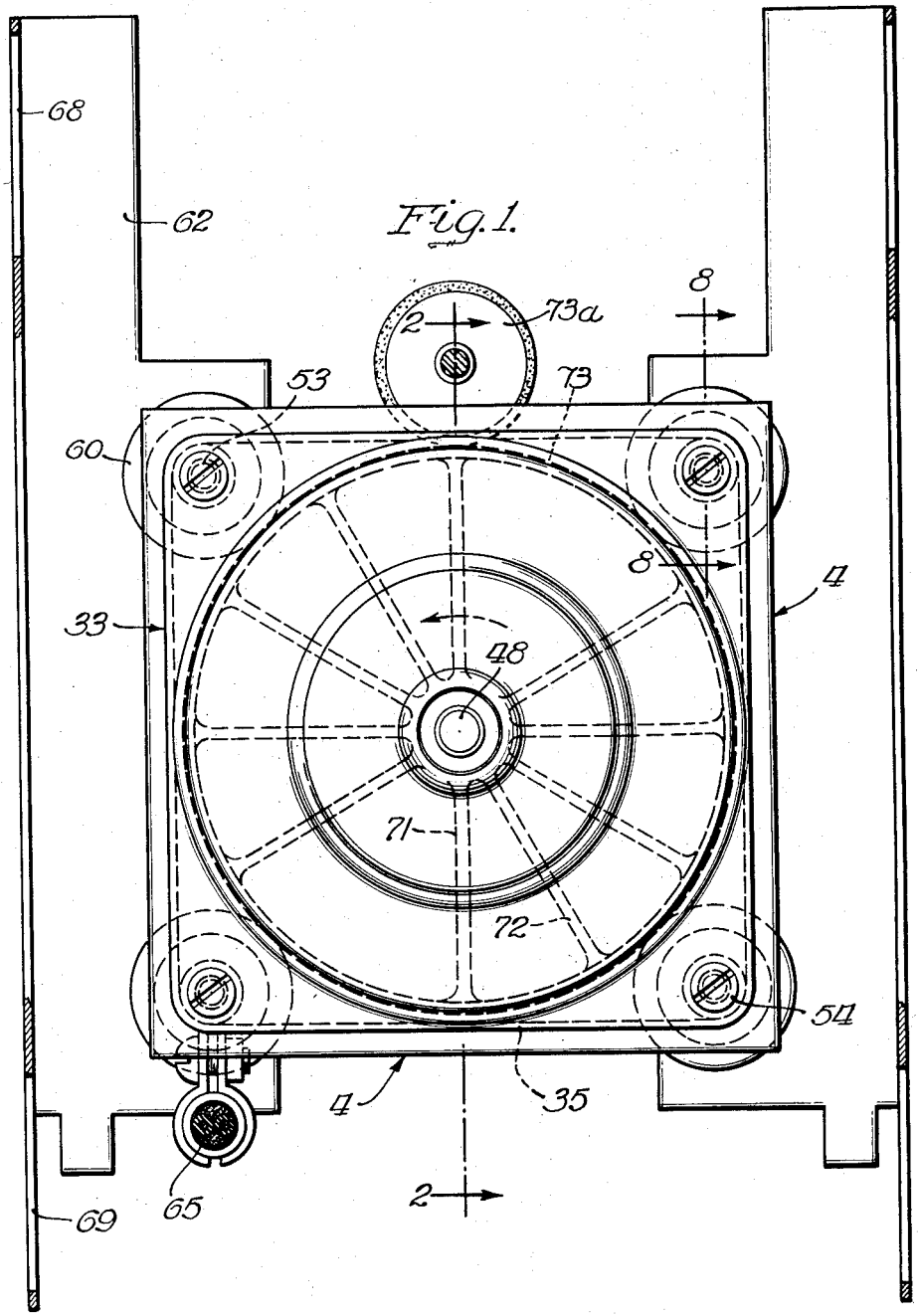
Figure 1 is a side elevational view of a motor constructed according to the principles of the present invention and as viewed from the outboard end thereof.

A a further constructional advantage, the fan 70 is provided with a peripheral cylindrical rim 73 which is readily accessible for friction driving a coacting companion friction wheel member 73a as seen in Figure 1 and which can be employed with this particular construction of motor. In this connection, any heat created through such a friction pulley drive would also be cooled by the adjacent expulsion of air as provided radially by the fan construction 70. The fan 70 is proportioned with a maximum diameter at the peripheral rim 73 to protectively locate rim 73 within the confines of the general motor structure and so that the friction drive unit does not extend outwardly beyond the motor framework. Furthermore, the bushings 14 are generally widely spaced and only constitute small cylindrical streamlined units which offer very little resistance to the radial air flow through the motor framework as brought about by the ventilating or cooling fan 70. Furthermore, the rim 73 of the fan 70 is readily accessible in a plurality of circumferential locations between the adjacent positions of the bushings 14.

The general course of the air and its circulation through the motor is indicated by the arrows in Figure 2, and it is to be noted that the air is drawn radially inwardly at the left hand side of the motor to channel through the zone between plate 32 and the adjacent face of the stator stack 4 thus brushing over the coil loops and also therethrough to be thereafter deflected in an axial direction aided by the configuration of the hood 41 of the bearing assembly 45 so that the air then travels generally axially through the openings in the armature and stator stack toward the fan chamber portion of the motor. Here the air is directed both radially and reversibly by the design of the fan 70 to provide a full circle of radially directed cooling air that leaves the motor fan carrying zone thus efficiently dissipating motor heat into the atmosphere. And if the general stator-rotor assembly is moved to the right as shown in Figure 2 with the fan 70 disposed in the left hand zone instead of the right hand zone of the motor, the air circulation will be reversed in its action and flow through the device.

The radial air circulation is brought about by the use of the vanes 71 in the cup shaped portion of the fan and also by the generally radially formed vanes 72. Thus in the structural arrangement shown in Figure 2, the air is also driven over the coils on the right hand side of the motor and through such coils to provide an efficient cooling and ventilating system for the motor. Attention is directed to the fact that the field coils 5, 6, 7 and 8 are looped through certain portions of the clover leaf openings previously described in connection with Figures 3 and 4, and that each of these field coils extends laterally outwardly from the stator stack surfaces to be looped through the oppositely established air circulating zones of the motor.

It should also be emphasized that this particular motor may have the fan structure and friction wheel location thereof readily located on the left hand side of Figure 2 by selected reversal of the general assembly parts of this motor construction as previously pointed out.

As shown in Figures 2 and 3, the rotor includes a plurality of metal rods or plugs 76 made of copper or other good current conducting metal which rods are force fitted and carried within the respective aligned openings 27 of each of the rotor plates 24 to increase the electrical efficiency and output of the motor per se. Also, as shown in Figure 2, rings 77 and 78 are also carried concentrically with the axle or shaft 2 and are attached adjacent the lateral outer faces of the rotor plates 24 and to the ends of the rods or plugs 76 as a further aid in increasing the electrical efficiency and power of the motor construction.

It is to be understood that certain further modifications may be made in the orientation means which set up the cooperative relationship between the assembled motor parts. As seen in Figure 12, this structure comprises a modification of the forms of the invention shown in Figures 8 and 10 and in the Figure 12 illustration the laminations or stator plates 9 are securely positioned by means of the sleeve 14a containing the bore 80 that is internally threaded at 81 and 82 for reception of a threaded stud 83 and a threaded bolt 84 respectively. The side frame plates 32 and 33 are secured to the ends of the bushing 14a by means of a lock nut 85 and by means of the head 86 of the bolt 84. In this case stud 83 extends outwardly to one side of the motor structure for connection with the rubber mounting bushing 60 being fastened thereto by means of the securing nut 87.

Figure 13 demonstrates the use of a cast end plate such as 33a which includes a dished portion 88 to carry the bearing unit 46 for the support of the motor shaft 2 and which cast unit includes the orientation openings or recesses 89 and 90 which receive the ends of the stator stack bushings 14 to provide an assembly following generally the constructions hereinbefore discussed in connection with Figures 8, 10 and 12.

A further arrangement or construction of end plate might be made using a die cast or stamping unit such as 33b shown in Figure 14 which includes the orientation sleeve members 91 and 92 for snugly encircling the outer periphery of the bushings 14 indicated in dotted lines in this illustration.

As shown in Figure 15, the sleeve units such as 91 and 92 are circular in form and include a concentric opening 93 in the face of the plate 33b to accommodate a securing bolt such as 54.

Another suggested variation is to use cooperative bushing and plate members such as shown in Figure 16 whereing in the sleeve arrangement on a plate such as 33c might have a different configuration such as the square member shown at 94 provided for accommodating the end portion of a bushing 95 which may be squared throughout or at the end portions thereof to provide a similar cooperative arrangement for true alignment of the various motor structure parts. In this case the square bushing 95 includes an aperture 96 to receive the fastening bolt or other securing means 97 therethrough.

Referring now more particularly to Figures 17 to 22 inclusive, these illustrations show a method and procedure whereby the stator plates and motor plates are efficiently and inexpensively fabricated for particular use in this motor as previously described. In Figure 17 a stock roll 98 of metal plate material is pivotally supported upon a trunnion such as 99 to feed out a tangential band 100 which may be cut into square stock pieces 101 that are fed or carried over a conveyor into presses for multiple operation in forming the stator and rotor plates. The operations used in forming the plate structures of the present motor are shown in step by step progression in Figures 18 to 21. Although the plate shown in Figures 18 to 21 follows the original plate and motor structures very closely as may be evidenced with reference to Figures 3, 4 and 5, there are some slight variations and, therefore, different reference numerals will be applied in describing the process in Figures 18 to 21. All of these figures merely show one quarter portion of the entire plate and it is to be understood that the other four sectors are similarly worked on and die punched accordingly.

In Figure 18, which illustrates the first step of forming the plate structures of the motor, the square stock 101 is punched to include one set of circularly placed openings 102, a key opening 103, and an opening 104 which forms a portion of the aperture for accommodating the shaded pole coil. All punched openings are referenced with respect to the virtual motor shaft axis point located coincident with the point of intersection of the vertical and horizontal dash and dot lines shown in Figure 18 and in the following Figures 19 to 21.

The second stage in the process is illustrated in Figure 19 which includes another peripheral set of openings such as 105, a shaft opening 106, and one of the coil receiving openings 107 with a suitable rivet aperture such as 108 completing this operation. It is to be noted that the central portion of the plate 101 carrying the two concentric rings of the openings 102 and 105 comprises the formation of the rotor plate which has at this point been carried along with the formation of the attached or integral portion of the stator plate.

Referring now to Figure 20, it is to be noted that the rotor section is now cut out of the stator action providing two separate units 9a and 24a. This step also includes the formation of a second opening 109 to enlarge the annular coil receiving opening in the stator 9a plus the orientation openings 110 which is located in the remote corner portion of the stock piece 101.

From the stage shown in Figure 20, a rotor section is completed except that these pieces are turned down to provide a definite clearance such as shown at 75a in Figure 21 when these parts are assembled cooperative relationship in the motor assembly. However, this last stage of the punch press procedure includes the addition of a second opening 104a which together with the opening 104 completes the shaded pole coil receiving aperture and furthermore, a large central punch opening 111 further enlarges the coil structure aperture and cuts through the inner peripheral core portion 112 as best shown in Figure 21. A shaded pole coil 23 is dotted in to show the position thereof and also a bridge member such as 113 may also be employed across the gap formed by the final enlarged punch opening 111.

While the orientation openings 110 could suffice as holding the stator stack pieces together, it should be noted that openings such as 114 were formed in the Figure 20 stage to provide rivet receiving openings tightly securing the stack laminations or plates together.

In the procedure of forming the stator and rotor plates it must be understood that the entire procedure is followed through by suitable orientation dies using the punched openings as references for lining up each stock piece 101 for subsequent openings and that the peripheral contour of each of these stock pieces is not the determining factor in moving through this consecutive punch process. In other words, all of the openings are definitely related to each other and in each piece there is included the reference opening 110 which receives the bushing members such as 14, 14' and 14a as described in the various modified arrangements. In obtaining the various stock pieces such as 101 from a roll of material such as 98 in Figure 17, there are external dimensional variations present which would make it difficult to orient a stack of plates through marginal orientation to satisfactorily provide the necessary aligned perforations in a plate assembly. In other words, the outer peripheral shape could not be used as a means for running the individual pieces 101 through successive die operations.

This situation is well illustrated in exaggerated form in Figure 22 wherein the plurality of stator plates 9a have been press fitted upon the orientation sleeves 14, this view demonstrating that the outer peripheral edges as shown by way of example at 115 and 116 actually form irregular book page edges that may or may not be aligned as the case may be. By working out this entire structure from a predetermined reference procedure including therein orientation openings such as 110, it is possible to assemble this entire stack with the openings formed and oriented therein to provide perfect alignment and, furthermore, the orientation bushings which coact with the openings 110 provide the coacting means for definitely prepositioning the motor frame parts or plates such as 32 and 33. Furthermore, since the same punching procedure includes the armature arrangement and since all of the openings and various electrical designs therein are also generated through the same punching procedure, the rotor plates will also be definitely fabricated for collective support upon a motor shaft that is carried by the perfectly aligned bearings which are supported by the two frame plates 32 and 33 as previously described.

It might be pointed out that the construction of the motor as originally described included the slots 22 which coacted with the openings 21 and for assembly and support of the shaded pole coils 23. In the latter plate construction there are no straight line slots or openings of any kind and the entire punch work has been performed through the use of only circular dies or punches which greatly simplify and reduce the cost of the process of making the stator and rotor plates. It might be stated by way of example that a normal die for a motor stator and rotor plate arrangement, which uses non-circular configurations and punchings, would cost approximately $12,000.00 and would stand up between 50,000 and 60,000 punchings per grind of .015 of an inch off of the surface of the die. With the presently designed rotor and stator arrangement made as specifically described in Figures 18 to 21, the dies only cost $4,000.00 and are capable of 100,000 punchings per grind. To emphasize the importance of such a die design using circular punchings, the die structure used in forming the Figure 3 stator plates which includes the slotted arrangements shown at 22 actually costs an additional $1,500.00.

The above related examples should, therefore, serve to emphasize what a round punch arrangement can mean wherein only circular punchings or openings are employed to carry out the method illustrated in Figures 18 to 21 in obtaining finished stator and rotor plates for motor as described in the preferred form of the construction illustrated in Figures 1 to 8 inclusive or in the motor parts described in Figures 18 to 20 inclusive.

The foregoing description relates to certain preferred embodiments of an electric motor construction designed according to the principles set forth by the fundamental concept of the present invention. Obviously, certain changes in the exact details of the various elements and in the combination of these elements are also contemplated. However, all modifications which may be made in the particular electrical motor construction described shall be governed by the breadth and scope of the language in the appended claim or claims directed to the motor construction of the present invention.

What I claim is:

1. An electric motor comprising, in combination, a stator stack having an armature core therethrough, and end plates to flank said stack and including armature shaft bearings, an armature shaft rotatably carried in said bearings, an armature mounted upon said shaft, an air circulating fan carried by said shaft in a predetermined spaced relation with respect to said armature, and cooperative positioning means carried by said stator stack and said end plates respectively comprising pin members having similar external peripheral contours and being connected with said stator stack, said pin members having their ends extending oppositely outwardly with respect to the opposite sides of the stack respectively, said end plates each being provided with outwardly projecting curved portions formed thereon to bodily engage given peripheral surface portions of said pins at each side of the stator respectively and to position said armature shaft centrally of said stator armature core and with the plates in contact with the outer end faces of said pin members whereby to position said end plates in given positions longitudinally of said shaft in predetermined spaced relations with respect to said armature and fan units, with at least one of said end plates providing baffle means adjacent said stator for directing fan circulated air into given channels for cooling said motor structure.

2. An electric motor comprising, in combination, a stator stack having an armature receiving opening therethrough, coils carried by said stator stack and including windings positioned outwardly of the opposite sides of the stator stack, an armature having a supporting shaft, motor frame plates occupying axially positioned planes spaced along said shaft and including bearings to support said armature and shaft, and positioning mechanism connected with said stator stack comprising abutment pins to engage said frame plates and to orient the positions of said plates with respect to the stator stack, said pins and stack being cooperatively arranged to dispose one of said frame plates at a greater predetermined distance from the adjacent face of said stator stack than said other plate and to position both frame plates in adjacent flanking spaced relation with respect to the protruding stator coil windings, said frame plates conforming to the configuration of said stator stack and providing baffles to axially shield the motor elements, one of said baffles coacting with said stator for directing the circulation of cooling air radially over one of the face portions of said stack at one side thereof and over and through said stator coil windings, and an air circulating unit connected with the armature shaft at the other side of said stack and arranged for operation in the clearance area of said motor established by the greater spacing of said other baffle from the adjacent face of the stator stack, said air circulating unit providing the instrumentality to draw ambient air radially inwardly through said motor parts and to force air radially outwardly at the opposite side of the stator and over said motor parts while bypassing air axially in relation to the stator and armature.

3. An electric motor comprising a rotor, a rotor shaft, a stator, field coils for said stator, and a framework to orient the aforesaid units comprising spaced solid end plates forming shields edgewise disposed in planes vertically arranged with respect to said rotor shaft and carrying bearings to support said rotor shaft, assembly mechanisms to rigidly connect said end plates and stator in predetermined spaced relations to provide radially outwardly open air zones flanking said plates to either side of said rotor-stator group, a fan on said shaft in one zone, said stator and rotor each having axial openings therethrough for air circulation, and said field coils being looped through certain of the stator openings and through said radial air zones, and said fan functioning to air-cool said motor by drawing ambient air radially inwardly through one of said zones and through said rotor-stator group openings and into the other of said zones to there direct said air radially outwardly, said air passing radially over and through said coils in both zones and along the axially positioned portions of the coils disposed in the stator openings provided for said coils.

4. In an electric motor as in claim 3, and wherein said stator elements and said plates provide radially extended portions positioned outwardly beyond to the coil and rotor group, and wherein said assembly mechanisms traverse said radial air zones as small cylindrical streamlined units connected with said stator end plates at said extended portions thereon.

5. In an electric motor, in combination, a plurality of apertured stator plates to form a stack and to carry associated coil means and including orientation openings in said plates, positioning members fitted through said plate orientation openings to support said plates with all related apertures in alignment, and motor frame stampings to carry the motor shaft and rotor, said motor frame stampings having integrally formed elements projecting outwardly therefrom to provide orientation configurations on said stampings, and said positioning members each including portions having similar configurations as said elements for coincidentally interfitting with the configurations of each respective element to dispose the motor shaft and rotor in predetermined alignment within the stator stack plates.

6. In an electrical motor of the character set forth in claim 5, and wherein the element configurations on said motor frame stampings provide upstanding wall portions adapted for direct surface contact with coacting portions of the positioning members, and wherein said coacting portions of said positioning members provide matching external contours thereon to coincide with the upstanding wall portions on said motor frame stampings.

7. An electric motor comprising a hollow laminated stator stack having orientation openings formed therethrough, a rotor for said hollow stack, a rotor shaft, and cooperative means to suspend said shaft in a given relation with respect to said stack to accurately position the rotor within the hollow of the latter comprising a plurality of elongated units securely fitted through said orientation openings in said stack and terminating in given planes arranged outwardly from the opposite faces of said stack, and spaced plate means having prepositioned shaft bearings to journal the rotor shaft, said plate means each having a surface configuration to directly engage all of the axial terminal faces of the ends of said elongated units at each side of said stator respectively, and contact elements projecting outwardly from the surface portions of each of said plate means to lie parallel to said elongated units and to at least partially coincide with radial surface portions of said elongated units to thus fixedly establish the relative axial and radial positions of all of the assembled motor parts.

8. In an electric motor combination of the character set forth and defined in claim 7 and wherein said elongated units present symmetrical exterior surface contours, and said contact elements of said plate means comprise circular flanges peripherally spaced about each of said plate means with said flanges touching and partially encircling the elongated units adjacent the associated plate means, said spaced flanges all occupying radially outwardly located positions on said plate means with respect to the common axis of said rotor shaft bearings for collectively gripping said units over said symmetrical exterior surface portions thereof.

9. In an electric motor, the combination with a laminated stator stack having a bore for the reception of an armature, of a plurality of projections carried by said stator stack and extending outwardly from the opposite faces of the stack with their ends terminating in predetermined planes flanking opposite sides of the stack, frame plates to flank the opposite faces of said stator stack and to seat against the ends of the adjacent projections, each of said plates having a bearing for an armature carrying shaft, and coacting orientation means on said stator projections and on said frame plates respectively to properly position the plate bearings to align the armature shaft in operative relation with respect to the bore of said stator stack, said coacting orientation means comprising flanged portions formed on said frame plates to extend therefrom in the directions of said stator projections and in a manner to provide surface contact therealong, said projections having a given external surface contour, and said flanged portions having a contour to match and to coincidently circle at least a portion of the external contour of each of said projections to thus provide a rigid orientation surface union between said plates and the projections to fixedly align said armature shaft bearings and the armature shaft mounted therein.

10. In an electric motor, the combination with a laminated stator stack having a bore for the reception of an armature, of a plurality of projections carried by said stator stack and extending outwardly from the opposite faces of the stack with their ends terminating in predetermined planes flanking opposite sides of the stack, frame plates to flank the opposite faces of said stator stack and to seat against the ends of the adjacent projections, each of said plates having a bearing for an armature carrying shaft, and coacting orientation means on said stator projections and on said frame plates respectively to properly position the plate bearings to align the armature shaft in operative relation with respect to the bore of said stator stack, said coacting orientation means comprising flanged portions formed on said frame plates to extend therefrom in the directions of said stator projections and in a manner to provide surface contact therealong, said projections having a given external surface contour, and said flanged portions having a contour to match and to coincidently circle at least a portion of the external contour of each of said projections to thus provide a rigid orientation surface union between said plates and the projections to fixedly align said armature shaft bearings and the armature shaft mounted therein, said stator stack being provided with aligned apertures to carry said projections, and said projections each comprising a radially outwardly expandible member frictionally retained within each aligned group of stator apertures with the external contour of such expandible member being controlled by the size of said apertures so as to not affect the proper functioning of said orientation means.

11. In an electric motor, the combination with a laminated stator stack having a bore for the reception of an armature, of a plurality of projections carried by said stator stack and extending outwardly from the opposite faces of the stack and terminating in coplanar relation to each side of said stack, frame plates to flank the opposite faces of said stator stack to bear against the collective ends of the stack projections respectively, said plates each including a bearing for an armature carrying shaft, and flanged parts on each of said frame plates constructed and arranged to at least engage and partially encircle radially outer surface portions of the stator stack projections on one face of the stack to position the associated armature bearing in a predetermined relation with respect to said stack and to align said armature bearing with the complementary bearing of the other matching frame plate positioned on the other ends of the projections at the opposite face of said stator stack, said flanged parts of each plate simultaneously engaging the side surface portions of all of said projections at radially outwardly located points considered in relation to the axis of said armature carrying shaft.

References Cited in the file of this patent
UNITED STATES PATENTS

| | | |
|---|---|---|
| 1,123,319 | Kunkel | Jan. 5, 1915 |
| 1,408,931 | Cooper et al. | Mar. 7, 1922 |
| 1,652,401 | Forss | Dec. 13, 1927 |
| 2,039,456 | Sammarone | May 5, 1936 |
| 2,092,043 | Atwell et al. | Sept. 7, 1937 |
| 2,120,427 | Kronmiller | June 14, 1938 |
| 2,460,063 | Cole | June 25, 1949 |
| 2,462,204 | Ludwig | Feb. 22, 1949 |
| 2,490,209 | Cornwall | Dec. 6, 1949 |
| 2,512,905 | Willits | June 27, 1950 |
| 2,530,532 | Moody | Nov. 21, 1950 |
| 2,603,674 | Koch | July 15, 1952 |

FOREIGN PATENTS

| | | |
|---|---|---|
| 60,436 | Netherlands | Jan. 15, 1948 |